United States Patent

Murphy et al.

[11] Patent Number: 6,040,072
[45] Date of Patent: Mar. 21, 2000

[54] APPARATUS AND METHOD FOR COMPRESSING A STACK OF ELECTROCHEMICAL CELLS

[75] Inventors: Oliver J. Murphy; Carlos Salinas, both of Bryan; Alan J. Cisar, Cypress, all of Tex.

[73] Assignee: Lynntech, Inc., College Staton, Tex.

[21] Appl. No.: 08/974,384

[22] Filed: Nov. 19, 1997

[51] Int. Cl.⁷ .................................................. H01M 8/24
[52] U.S. Cl. ............................................. 429/12; 429/37
[58] Field of Search .................................. 429/34, 35, 37, 429/100, 157, 159, 161

[56] References Cited

U.S. PATENT DOCUMENTS

| | | | |
|---|---|---|---|
| 4,020,244 | 4/1977 | Selinko | 429/100 |
| 4,345,009 | 8/1982 | Fahle et al. | 429/37 |
| 4,800,008 | 1/1989 | Detournay et al. | . |
| 5,037,711 | 8/1991 | Bonnaud et al. | 429/156 |
| 5,484,666 | 1/1996 | Ibb et al. | . |
| 5,789,091 | 8/1998 | Wozniczka et al. | 429/12 |

*Primary Examiner*—Maria Nuzzolillo
*Assistant Examiner*—Monique M. Wills

*Attorney, Agent, or Firm*—Street & Associates

[57] ABSTRACT

The present invention provides an apparatus and method for assembling an electrochemical cell stack, or an assemblage of components which need to be clamped together, especially where minimizing the size and weight of the clamping mechanism is advantageous. The invention encompasses combining a band or strap to transmit load to a plurality of components. A metal link is provided to apply greater tension to the band than could normally be achieved with the band alone. The invention may provide a band having a spiral screw clamp wherein the screw portion is used to apply and control tension in the band and the band is used to transmit the tension to a plurality of components. The invention also provides systems that improve the distribution of the force over a portion of the assembly, preferably the entire area of at least one face of the assembly. The invention encompasses a system with straps surrounding a fuel cell stack placed between two end plates, with raised ridges placed under the strapping system to concentrate the compressive force at selected points on the endplates. The invention also encompasses a device comprising an array of adjustable elements that control the distribution of the compressive load.

44 Claims, 5 Drawing Sheets

APPARATUS AND METHOD FOR COMPRESSING A STACK OF ELECTROCHEMICAL CELLS

This invention was made with U.S. Government support under contract N00014-95-C-0023 awarded by the Department of Defense under DARPA. The U.S. Government has certain rights in this invention.

FIELD OF THE INVENTION

The present invention relates to devices and techniques for assembling components. The invention particularly relates to devices for the assembly and compression of electrolyzer cells and cell stacks.

BACKGROUND OF THE INVENTION

Conventional construction of fuel cell and electrolyzer stacks, especially proton exchange membrane (PEM) stacks, require a large number of flat components (including bipolar plates, membrane and electrode assemblies, and, optionally, cooling plates) to be assembled between a pair of heavy metal endplates. The entire assembly is placed in compression through the use of a series of long threaded metal rods (tie rods) extending from one endplate of the assembly to the other endplate with nuts or other fasteners on either end.

FIG. 1 is a side view of an electrochemical stack 10 built using a conventional stack design. A cell stack 12 is disposed between two endplates 14. The cell stack and endplates are compressed by extending metal rods 16 from one endplate to the other endplate and fastening the ends of the rods, such as with bolts 18. The type of design depicted in FIG. 1 is often referred to as a "filter press" design.

While conventional "filter press" designs may be straightforward, and effective, they are also bulky and heavy. In conventional "filter press" designs the entire load is applied by the bolts along the edges of the stack. In order to compress the stack as evenly as possible over the cross-sectional area of the stack without bending the end plates, the endplates are made very thick. While increasing the thickness of the end plates may help make them rigid, increasing endplate thickness results in an increased total weight of the electrolyzer stack. Another contributing factor to the increased weight in the "filter press" design is the necessity to place the tie rods around the perimeter of the active portion of the stack, thereby requiring endplates that are even larger in area than the stack.

The size of the end plates can be marginally reduced by placing the tie rods inside of gas passages, and therefore, inside the area of the bipolar plates. While this type of design allows reduction in electrolyzer stack-weight, the reduction is limited by the continuing need for heavy rods and rigid endplates in this type of design.

FIG. 2 is a cross sectional view of a "filter press" type stack 20, similar to the design of FIG. 1, with a "spider" 22 added to improve the distribution of the closing force. The tie rods 24 pass freely through the endplates 26 and around or through the stack 28. In this design, tightening the nuts 25 on the ends of the rods 24 pulls down on the lever arms 27 of the spider 22 and transfers the force to the center of the stack. The design of FIG. 2 allows for leveling and distributing the load away from the edges by including a floating load distribution feature in the endplate design.

There are two separate sets of tie rods in the "filter press" design of FIG. 2. One set of rods (not shown, but similar to those in FIG. 1) secure the endplates against the stack, with all of the force applied at the corners. The other set of rods 24, pass freely through the endplates and the stack. When the nuts on the tie rods are tightened, the totality of the force is applied to the endplates at locations imposed by the design (e.g. the center of the endplate as shown in FIG. 2). While this approach does improve the distribution of the closing force over the area of the stack, and may assist in keeping the center of the stack in compression, it also leads to an increase in unproductive stack volume, and in the weight of the endplate assemblies. The weight reductions offered by improvements such as those described in relation to the "filter press" design of FIG. 2 are significantly limited.

Therefore, there is a need for an assembling device or system that compresses stacks without adding much weight and volume. Further, it would be desirable if the assembling devices provided more flexibility and control in adjusting the degree and distribution of compression.

SUMMARY OF THE INVENTION

The present invention provides an apparatus for securing an electrochemical cell stack comprising a banding member. The banding member may form a continuous circle or may have first and second ends joined by a fastener. The fastener may be a metal link, a clamp, a bolt, a rivet and the like or a combination thereof. The banding member may comprise one or more straps.

The invention also provides a component assembling device comprising a banding member and a fastener. In one aspect of the invention the banding member has first and second ends surrounding edges of the assembled components and providing compression force to keep the components assembled and under compression; and wherein the fastener secures the first and second ends of the banding member to sustain the compression force for a period of time. The fastener may comprise a metal link, clamp, bolt, rivet and the like. The banding member may comprise one or more straps, cords, ropes, cables, belts or the like. In one aspect of the invention, the banding member comprises a polymeric component and/or a fibrous component.

The component assembling device provided by the invention may further comprise a tension adjusting system. The tension adjusting system may be part of the fastener, for example, a screw closure clamp joining the first and second ends of the banding member. The screw closure clamp may comprise a first crimped closure and locking pin fastening the first end of the banding member adjacent the screw closure clamp, and a second crimped closure and locking pin fastening the second end of the banding member adjacent the screw closure clamp The component assembling device of the present invention may also comprise one or several load distributing elements placed between the banding member and the assembled components. The load distributing elements may or may not be integral to the assembled components' surrounded edges, preferably the endplates in a fuel cell stack and endplate assembly. The load distributing elements may also be held, secured or removably lodged within or to the assembled components.

Furthermore, the load distributing elements may comprise one or more ridges, that may be placed between the banding members and the assembled components surrounded edges. The ridges may have various heights for avoiding interference between the banding members. Finally, the load distributing elements may comprise one or more set screws.

A preferred component assembling device may comprise first and second sets of straps and ridges wherein the second set of straps run cross-wise to the first set of straps. The ridges in the first set of straps may have greater height than the ridges in the second set of straps.

The invention also encompasses an assembly, such as one or more electrochemical cells, comprising a plurality of components, such as plates and membranes, and a component assembling device, comprising one ore more banding members. Preferably, the plurality of components have rounded corners for greater control over the tension of the banding member. The component assembling device may further comprise one or more set of screws providing additional compression force for greater flexibility in adjusting and distributing the compression force.

The component assembling device of the present invention may be used to assemble one or more electrochemical cells arranged in the form of a stack placed between two endplates. Electrochemical cells used in conjunction with the present invention may comprise fuel cells for generation of electricity, PEM electrolytic cells and the like.

The present invention also encompasses a method of assembling and compressing a plurality of electrochemical cells arranged in the form of a stack placed between two endplates. The method comprises: surrounding the endplates with a banding member and fastening the banding member with a fastener; wherein the banding member has first and second ends and provides a compression force to keep the stack and endplates assembled and under compression; and wherein the fastener joins the banding member first and second ends.

The method of this invention may further comprise adjusting the compression on the stack. Adjusting the compression force may be achieved by placing a screw-type device at the first end of the banding member and a threaded receiver at the second end; the screw provides control of the tension on the banding member.

The method of the present invention also provides for placing one or more ridges between the endplates and the banding member for greater control of the distribution of the compressive force. The ridges may or may not be integral to the endplates. The ridges used in the present invention may have various shapes and forms, but, when using ridges that not integral to the end plates, cylindrical ridges are preferred. When removable ridges are used, the endplates may have depressions for lodging the removable ridges.

The method of the invention also encompasses placing a plurality of threaded holes in the endplate, wherein the threaded holes are oriented out of the plane of the endplates; and placing a plurality of threaded components in the threaded holes; wherein the threaded components provide a mechanism of controlling the distribution of the compressive force exerted over the cell stack by varying the extension of the threaded component from the side of the endplates facing the stack.

The method of this invention also comprises placing an insulating barrier between the threaded components and the electrochemical stack. The method may further comprises coupling each threaded component to a load cell or other force reporting device for individual monitoring of the compressive load exerted by each threaded component. The force reporting devices used in conjunction with this invention may or may not be integral to the threaded components.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
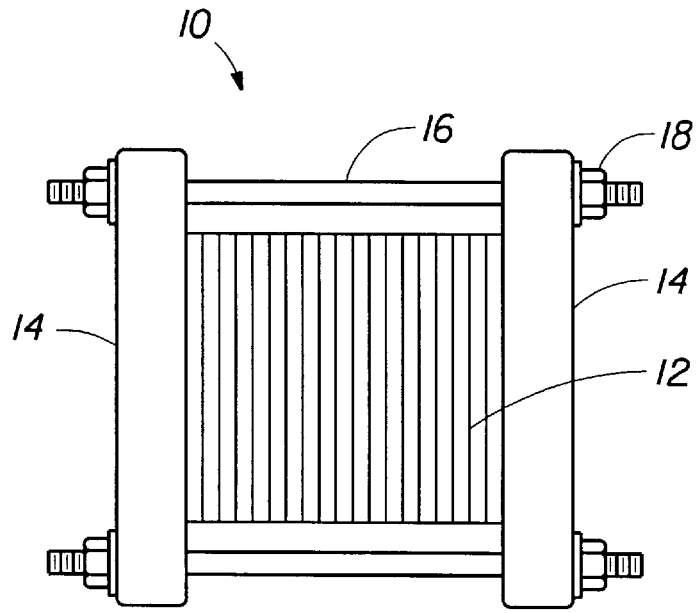
FIG. 1 is a side view of an electrochemical stack of conventional design.

The present invention provides a device and method for assembling an electrochemical cell stack, or an assembly of components which need to be clamped together, especially where minimizing the size and weight of the clamping mechanism is advantageous. The invention may comprise a band or strap to transmit load to a plurality of components. The invention may also comprise a fastener to apply greater tension to the band than could normally be achieved with the band alone. The invention also provides a band having a spiral screw clamp wherein the screw portion is used to apply and control tension in the band and the band is used to transmit compression to a plurality of components.

The invention also provides systems that improve the distribution of the force over a portion of the assembly, preferably the entire area of at least one face of the assembly.

The present invention encompasses a system of straps surrounding a cell stack placed between two end plates, with raised ridges placed under the strapping system to concentrate the compressive force at selected points on the endplates. The invention may also provide a device comprising an array of adjustable elements that control the distribution of the compressive load.

One aspect of the present invention provides a strap and a fastener to secure a group of flat components and maintain them in compression. The invention also provides a fastener to secure the assembly and a series of load distributing elements that permit precise control of the distribution of the closing force over the area of the assembly.

The invention provides a compact strapping system comprising a strap that may be passed through a rectangular link, folded back onto itself, and attached such that the strap may be fastened around one side of the metal link. The attachment can be made in a number of ways, with the exact choice depending on the composition of the strap and the equipment available. Particularly, the invention may comprise a hybrid strap, made of a polymeric component and another component, such as a fibrous material, is used. It can be easily appreciated that the use of other types of closures is clearly within the scope of the present invention. The present invention also encompasses the use of other techniques of fastening the straps, for example, each strap may be bonded to itself with adhesive, or, where the straps comprise a thermoplastic, fastening may be achieved by welding the strap.

The invention provides several techniques and tools that may be used to apply tension on the strap. For example, after placing a strap around the components being assembled, a first end of the strap may be attached to a link and a tightening winch may be used to pull a second end of the strap until it is adequately tight. While keeping the tension on the strap, the second end may then be attached onto the strap to prevent loosening. In attaching the second end of the strap to the link, any of the methods listed for attaching the first end of the strap to the rectangular link can also be used to make the final closure. However, high temperature welding should generally be avoided, since the portion of the strap that is heated may deform and result in relieving the tension.

The stack assemblies of the present invention present significant improvements compared to the design of FIG. 1 which uses rods for assembling the stack components. A major improvement provided by the strapping system of the present invention is that the height and width of the endplates relative to the active portion of the stack may be substantially reduced, resulting in a significant decrease in the overall size and weight of the stack. Also, the endplates in the stack assembled using the strapping system may be significantly thinner, thereby allowing further reduction in weight and volume of the stack.

Frequently, when an electrochemical stack is thermally cycled, the difference in the coefficients of expansion for the different components produces deformations in some of the components. The most frequently observed deformations are stretching of tensile members or irreversible compression of the gaskets or other soft sealing components in the stack. Either of these deformations can cause a loss in compression, and possibly gas leakage. The present invention addresses deformation problems by providing strapping systems with a tension adjusting member to help maintain the assembly at a desired compression level. This aspect of the invention avoids fluid leakage and other system failures related to changes in the level of compression.

Another aspect of the invention provides locking pins that may help prevent a strap from pulling out of a crimped closure. This system permits the use of strappings in a system with a tension adjusting member, such as a screw closure clamp. Alternatively, the screw closure clamp may be formed integrally with the strap so that crimped closures and locking pins may be omitted.

In another aspect of the invention, addition of a few small elements, placed between the straps and the assembled components may greatly improve the load distribution for a strap-type closure system.

Figure 2:
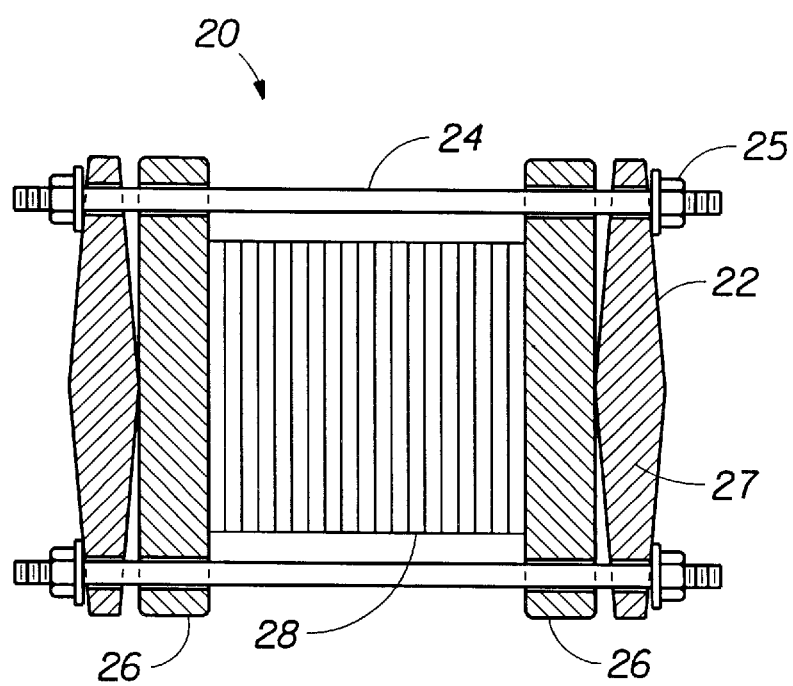
FIG. 2 is a cross sectional view of a "filter press" type stack with a "spider".

While the strapping system of this invention presents significant improvements over the tie-rod closure system of FIG. 1, such as but not limited to enhanced application of the load to the active portion of the stack, the use of load distributing elements in conjunction with the present invention presents even greater improvements. The load distributing elements may be arranged in a variety of ways. For example, adding a single element, such as a rod or ridgeline, at the center of the stack, adds a central force component, and adding two load distributing elements may produce an even more uniform load distribution. It is to be noted that the present invention encompasses load distributing systems with various degrees of complexity comprising, but not limited to, appropriately configured ridgelines with properly selected heights so that in any particular system, the load is spread over as much of the area as is desired. It can also be appreciated by those skilled in the art, that the invention encompasses the use of any number of rods having various shapes, lengths and heights. Compared to using a "spider" as illustrated in FIG. 2, the addition of ridgelines to the endplates adds very little to the volume and the mass of the stack.

A further aspect of the invention provides for securing the load distributing elements placed between the straps and the stack. Unsecured load distributing elements may shift, either releasing the stack from compression, or changing the load distribution. Adding a depression or a shallow groove to the endplates may add a significant improvement in keeping the load shifting elements in place. For example, the use of a groove may prevent a rod, used as a load redistributing element, from shifting and enhances the reliability of the load shifting mechanism described above. Securing the load distributing elements may also be achieved by fabricating the load distributing element as part of the assembled components. For example, in the case of a cell stack and endplate assembly, ridges may be fabricated as part of the endplate itself to provide a unitized structure design. It should be noted that although the use of a separate element with a positioning depression is preferred, fabricating a load distributing element, such as a ridge, as part of the endplate is within the scope of the present invention.

Another aspect of the invention relates to the shape of the endplate edges. Particularly, the use of rounded edges, as described in this invention, is beneficial in several respects. One advantage is that rounded edges permit the straps to slide over the edges more easily. A further advantage is greater control of the load distribution achieved with proper selection of the curve used for the edge. Further, the invention encompasses the production of a catenary curve that matches the shape of the edge to the specific size, span, and load of the stack and the shape of the curve at the edge used to distribute the load over a wider margin at the edge of the endplate. Yet another advantage is the elimination of sharp corners that could cut or deform the strap.

Another aspect of the invention provides for significant reduction in the clearance between the straps used for the closure and the edges of the stack. Minimal clearance between the straps and the stack is important to minimize the volume associated with the use of the strap type closure system of this invention. The invention also encompasses the building of a stack with no actual clearance between the straps and the perimeter edges of the components of the stack. In this arrangement provided by the invention, the straps are prevented from interacting with the edges of the membrane and electrode assemblies by either using a narrow air gap, or a thin protective separator, between the side of the stack and the straps. When a thin protective separator is used, the smallest endplates can be used for a stack of a given size. Also, it is important that the metallic fasteners do not come in contact with electrically conductive bipolar plates to avoid an electrical short. Alternatives provided by the invention in avoiding such electrical shorts comprise using a thin electrical insulator, coating all of the metallic components with an electrically insulating coating, or fabricating a fastener with no conductive components.

Yet another aspect of the invention provides a fuel cell stack assembling device comprising straps and ridgelines oriented in two crosswise directions, preferably in substantially perpendicular directions where the endplate is a substantially rectangular shape. This arrangement may comprise ridgelines added to spread the closing force over the active area of the stack. In order to minimize interference between straps running in different directions, different straps may be kept at different levels by using higher ridgelines for straps running in a first direction, and lower ridgelines for the straps running in a direction perpendicular or otherwise different from the first direction. It can be easily appreciated by those of skill in the art, that various other parallel and non-perpendicular arrangements of the ridges and the straps are within the scope of the present invention.

Another aspect of the invention provides for dynamic adjustment, such as with an actuator, of the tensioned strapping of a fuel cell or a stack of fuel cells. For example, an endplate system may secure a stack in electrical contact with a separate current collector, electrically isolated from the rest of the endplate. The main body of the endplate may be tightened into position by tightening the strap(s).

During initial tightening, most of the load may be applied around the edges of the stack. The load may then be redistributed by adjusting one or more compression screws. This type of endplate configuration may be designed to permit greater control of the closing force, for the entire stack and for individual locations across the surface of the stack as well.

Also, the endplates may be initially tightened to put the stack into partial compression by tightening the straps while the screws are at least partially retracted into the endplates. One advantage of this type of endplate configuration is that it is not necessary to achieve a high degree of compression during assembly of the stack, since enough initial compression to take up the slack in the straps is sufficient. After tightening the straps, the stack may be further compressed by tightening the screws to press against the current collector.

Since the number of electrical contacts involved in transmitting electrical current through the screw compression arrangement described here may be significant, the use of an electrically hot endplate in this configuration may be inefficient. It is important to note however, that the present invention is suitable for use with both "hot" endplate designs, where the endplate also serves as the current collector, and designs with a separate current collector plate in electrical contact with the stack, and electrically isolated from the endplates.

Also, the current collector may be separated from the endplate by a set of insulators. For example, each of the compressive screws may have its own insulator, alternatively, some or all the insulators may be combined into one single sheet. The invention also encompasses using non-conductive screws or bolts. It can be easily appreciated by those skilled in the art that other methods for producing an electrically insulating barrier are also within the scope of the present invention.

One method of obtaining a desired compression on the stack using the array of screws and bolts provided by the present invention, comprises tightening each screw in a measurable and reproducible manner. For example, even tightening may be achieved by using a torque wrench, and each screw is brought to the tightness required to obtain the desired compression for that location on the stack. The invention may use a precision torque wrench, and particularly, an instrument capable of delivering a torque reproducible with a precision of ±1 or ±2% is preferred.

Further, conversion from torque to compressive force is variable, with the exact compression produced by a given torque depending on several factors, such as the smoothness and coefficients of friction of the surface of the screw and the surface of the threaded hole in the endplate, the lubricity of the surfaces and the exact angle between the screw and the hole. Careful selection of materials and precision machining may help eliminate variation in the first two factors, and careful cleaning and surface treatments may help address the third. The angle, however, can be changed by factors such as the tightening sequence and variations in the thickness of the components being compressed.

Another aspect of the invention provides real-time adjustment of the closing force in response to changes in the magnitude of the compressive force. The invention provides for active and detailed control of closing force over the entire area of the stack. The loads applied by each screw can be closely matched if that load is actively measured. This can be accomplished, and direct feedback supplied to an operator, through the use of one of a number of solid state electronic devices. For example, individual load cells may be positioned between each of the screws and the current collector plate and the load cells connected to meters, or other output devices. Preferably, each of the screws is tightened until each of the load cells indicates the same compressive force.

One aspect of the present invention is the ability to apply a greater force over one portion of the stack, such as the central portion, than over another portion of the stack. Each of the screws may be tightened until the desired force pattern is obtained. The present invention also encompasses the ability to provide any desired pattern of compressive force on the stack.

Another aspect of the invention provides a simplified system that includes a load cell as part of the screw. Particularly, the load may be included as part of the screw by using load bolts. In this approach, the bolt itself contains the load cell, which is connected to a meter, and the bolt is tightened until the desired load pattern is achieved.

Yet another aspect of the invention provides load cells to obtain real time feedback on changes in the load brought about by temperature changes or by aging of the materials. As the changes are identified, the screws may be adjusted to return the stack to its original state, or any new state of compression as desired. The active load distribution control system of this invention, or even an inactive load distribution system, may be used either symmetrically, with a set of adjusting screws on each end of the stack, or asymmetrically with adjusting screws at only one end of the stack. Systems with symmetrical load distribution provide a greater range of variation for tuning and adjustment of the load, while the asymmetrical load distribution systems provide lighter stacks, allowing the end that does not comprise adjustment screws to have a much simpler endplate design.

It is important to note that the present invention encompasses the use of the active load distribution control system with conventional tie-rod closure systems. It should be appreciated by those skilled in the art that many aspects of the invention disclosed herein may also be directed to tie-rod closure systems or other equivalent systems and are deemed to fall within the scope of the present invention.

Figure 3:
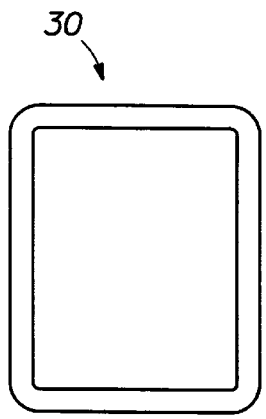
FIG. 3 is a face view of a rectangular metal link closure system.

FIG. 3 is a face view of a rectangular metal link 30 depicting one aspect of the invention, comprising a compact closure system. A strap may be passed through the rectangular link, folded back onto itself, and attached such that the strap is fastened around one side of the metal link. The attachment can be made in a number of ways, with the exact choice depending on the composition of the strap and the equipment available.

Figure 4:
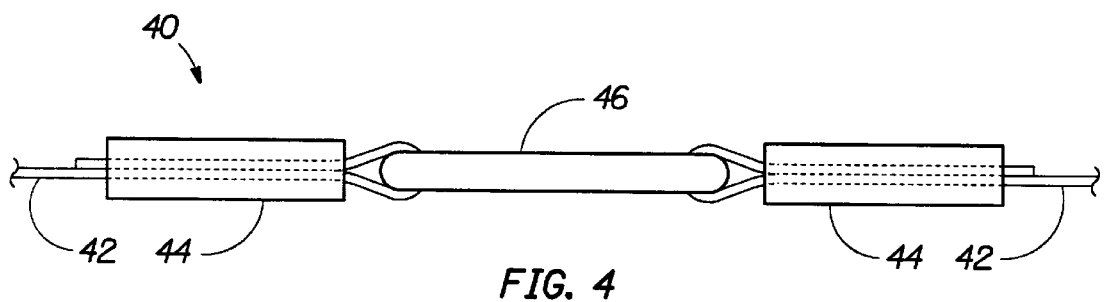
FIG. 4 is a side view of a double crimped metal link closure system.

FIG. 4 is a side view of a double crimped metal link closure system 40. Crimped metal closures 44, such as those sold by Gulf Systems of Humble, Tex., are used to secure the strap 42 into a loop passing around a metal link 46. It can be easily appreciated that the use of other types of closures is clearly within the scope of the present invention.

Figure 5:
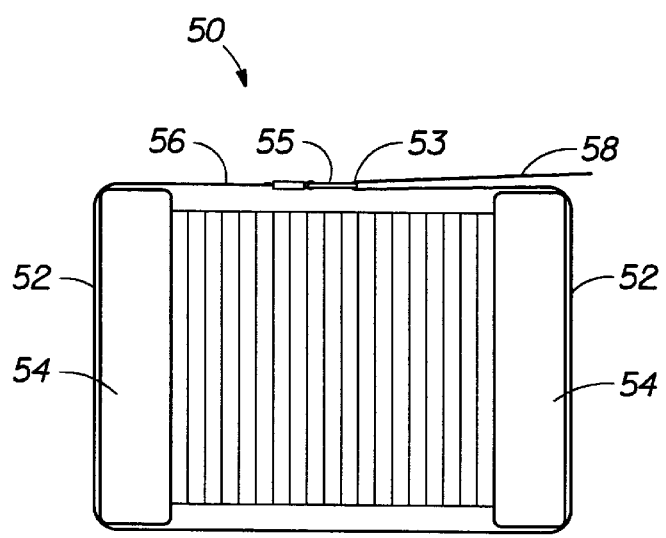
FIG. 5 is a schematic diagram depicting a stack with a strap and closure system.

FIG. 5 is a schematic diagram of a stack with a strap and closure system of the present invention. The arrangement of FIG. 5 shows a stack 50 with a strap 52 encircling the two endplates 54. The schematic diagram shows a first end 56 of the strap 52 firmly attached to a rectangular link 55. A second end 58 or free end of the strap is threaded through the rectangular link and folded back, as shown in the diagram. The folding of the free end of the strap around the rectangular link provides a point of tension 53. Several techniques and tools can be used to apply tension on the strap. As an illustration, a tightening winch available from Gulf Systems of Humble, Tex. was used. With this tool, the base of the tool is placed on one of the flat endplates, e.g. the right-hand side as viewed in FIG. 5, and the winch used to pull the free end of the strap until it is adequately tight. While keeping the tension on the strap, the end is attached onto the strap to prevent loosening.

Figure 6:
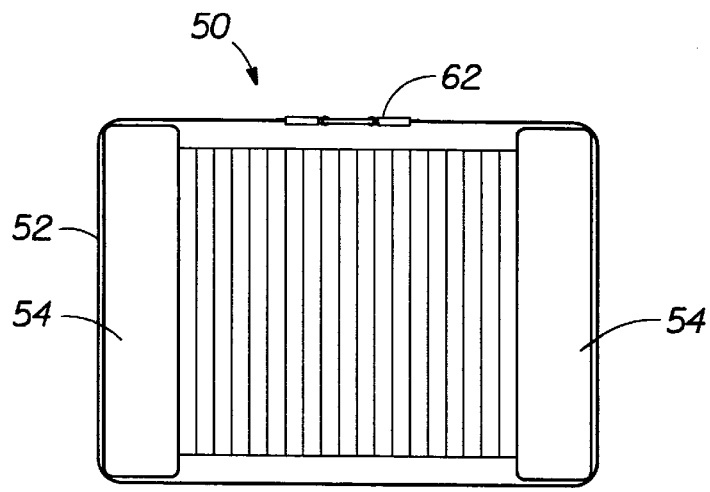
FIG. 6 is a schematic diagram depicting a stack with a tightened band and second crimped closure.

FIG. 6 is a schematic diagram of the stack 50 with tightened straps 52 and second crimped closure 62 applied at the end of the strap depicted as the free end 58 in FIG. 5. The stack assembly 50 presents significant improvements compared to the design of FIG. 1 using the rods. The height and width of the endplates 54 relative to the active portion of the stack 50 has been substantially reduced, resulting in a significant decrease in the overall size of the stack.

Figure 7:
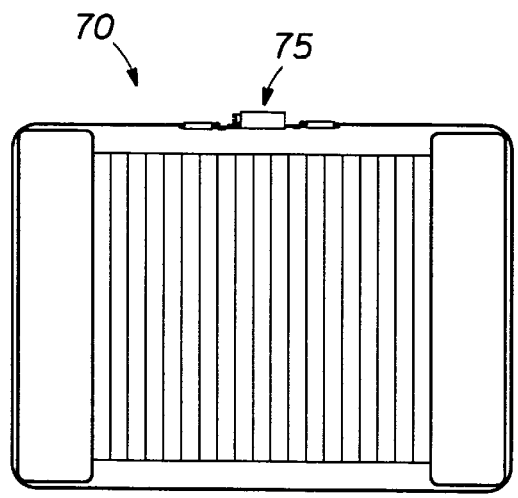
FIG. 7 is a drawing of an electrochemical stack with a tensioned strap closure system.

FIG. 7 is a drawing of an electrochemical stack 70 with a tensioned strap closure system 75. The strap tension adjustability features in the tensioned strap closure system 75 help maintain the assembly at a desired compression level.

Figure 8:
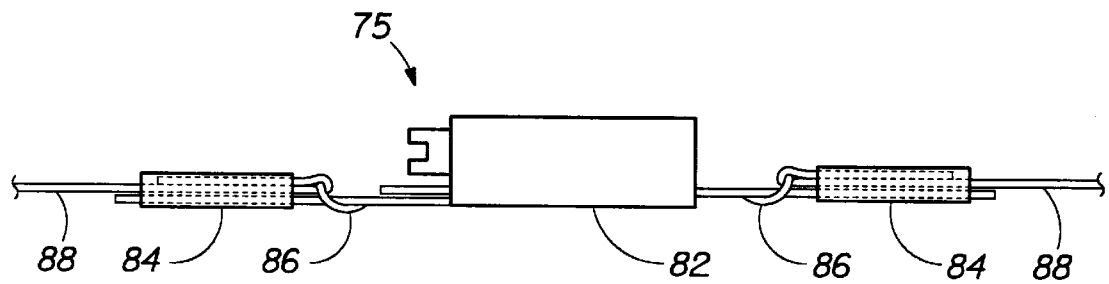
FIG. 8 is an enlarged side view of a tensioned strap closure system.

FIG. 8 is an enlarged side view of the tensioned strap closure system 75 comprising a screw closure clamp 82, crimped closures 84 and locking pins 86. The locking pins are included to prevent the strap 88 from pulling out of the crimped closures.

Figure 9A:
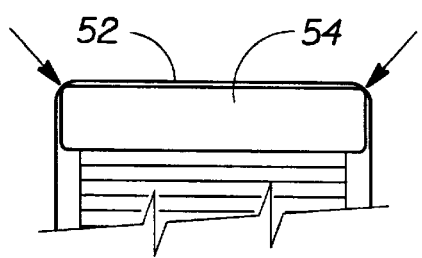
FIGS. 9($a$–$c$) are schematic diagrams of strap type closure systems with no load distributing element, with one load distributing element, and two load distributing elements, respectively.
Figure 9B:
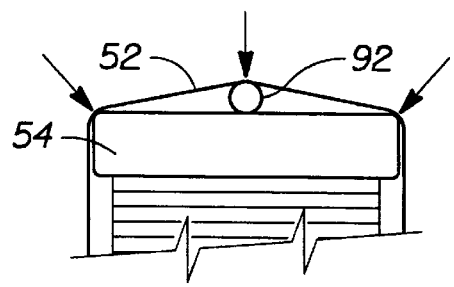
Figure 9C:
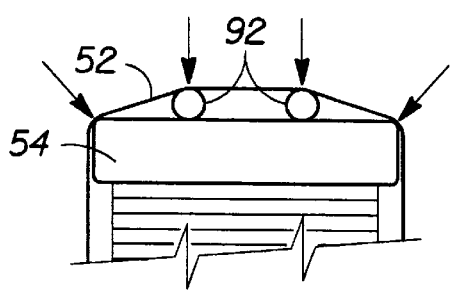

FIGS. 9(a–c) are schematic diagrams of strap type closure systems with no load distributing element, with one load distributing element, and two load distributing elements, respectively. In accordance with the invention, the addition of a few small, cylindrical elements 92 to the endplate 54 greatly improves the load distribution for a strap-type closure system. FIG. 9(a) shows a strap closure without any load distributing elements, such that most of the closing force (indicated by the arrows) is concentrated at the edges. Adding a single element 92, such as a rod or ridgeline, at the center of the stack, as shown in FIG. 9(b), adds a central force component, and adding two load distributing elements 92 as shown in FIG. 9(c) produces an even more uniform load distribution. The elements depicted in FIGS. 9(b–c) may have any diameters useful to achieve a desired load distribution.

While the aspects of this invention depicted in FIGS. 9(b–c) describe particular aspects of load redistribution in a strap-type closure, it can be easily appreciated that the present invention encompasses load redistributing systems with various degrees of complexity.

Figure 10:
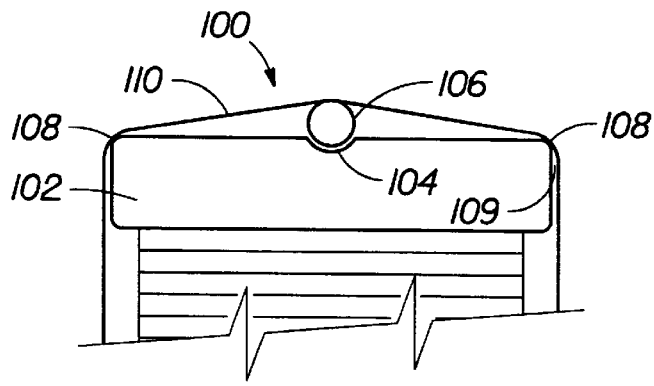
FIG. 10 is an enlarged cross sectional view of an endplate with a strap closure system.

FIG. 10 is an enlarged cross sectional view of an endplate 102 with a strap closure system 100. Endplate 102 may comprise a depression or groove 104 to resist displacement of a rod 106 used as a ridgeline, and rounded corners 108 so that the strap 110 applies its force more evenly to the endplate. The use of a groove prevents the rod from shifting and enhances the reliability of the load shifting mechanism described in FIG. 9(b–c).

Figure 11:
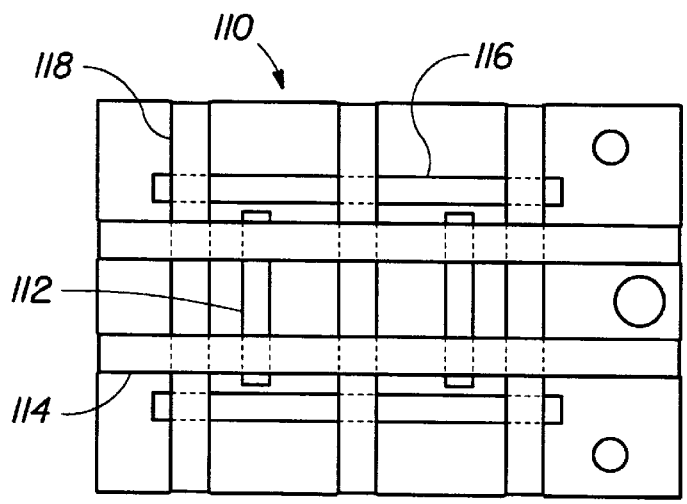
FIG. 11 is a face-on view of an endplate of a stack with a strap-type closure system.

FIG. 11 is a face-on view of an endplate of a stack with a strap-type closure system. The Figure shows the external face 110 of an endplate with straps, and ridgelines oriented in two crosswise directions. This arrangement illustrates a set of straps running in two directions and ridgelines added to spread the closing force over the active area of the stack. Using higher ridgelines 112 for the straps 114, and lower ridgelines 116 for the straps 118 allows for minimizing the interference between straps running in different directions.

In the arrangements depicted in FIGS. 9 and 10, all ridgelines are oriented in parallel to each other with the straps oriented perpendicular to the ridgelines. It can be easily appreciated by those skilled in the art, that various other parallel and non-perpendicular arrangements of the ridges and the straps are within the scope of the present invention.

Figure 12:
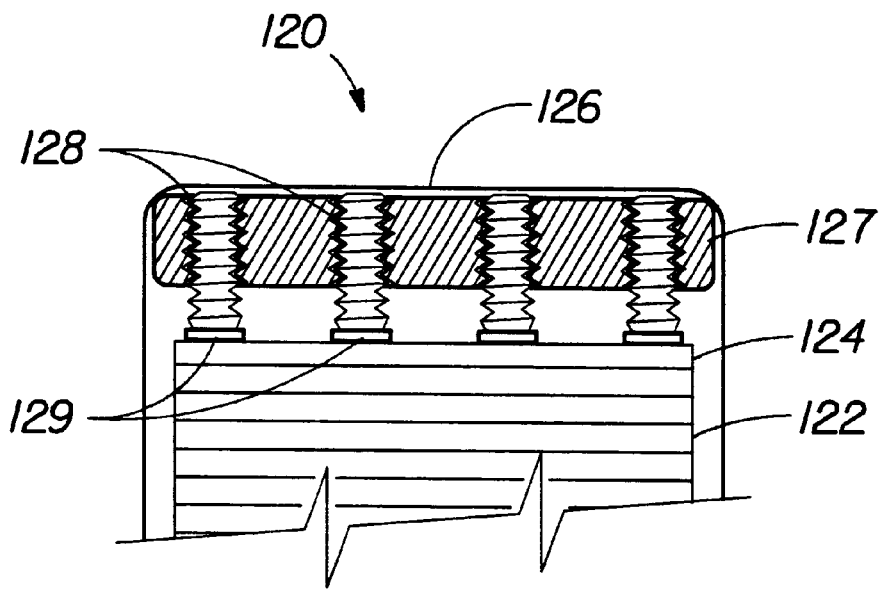
FIG. 12 is a cross sectional view of an endplate with dynamic adjustment.

FIG. 12 is a cross sectional view of an endplate system 120 providing dynamic or real-time adjustment. The endplate system 120 secures a stack 122 in electrical contact with a separate current collector 124, which is electrically isolated from the rest of the endplate by insulator 129. The main body of the endplate 127 is tightened into position by tightening the strap(s) 126. During initial tightening, most of the load may be applied around the edges of the stack, as shown in FIG. 9(a). The load may then be redistributed by adjusting one or more compression screws 128. The four screws shown represent one row of a two dimensional array of tensioning screws. Although each of the compressive screws shown has its own insulator 129, some or all the insulators may be combined into one single sheet. The endplate configuration 120 is designed to permit greater control of the closing force, for the entire stack and for individual locations across the surface of the stack as well.

As illustrated in FIG. 12, the endplates may be initially tightened to put the stack into partial compression by tightening the straps while the screws are at least partially retracted into the endplates. One advantage of the endplate configuration 120 is that it is not necessary to achieve a high degree of compression during assembly of the stack 120, since enough initial compression to take up the slack in the straps is sufficient. After the straps are tightened, the stack is compressed by tightening the screws to press against the current collector.

Figure 13:
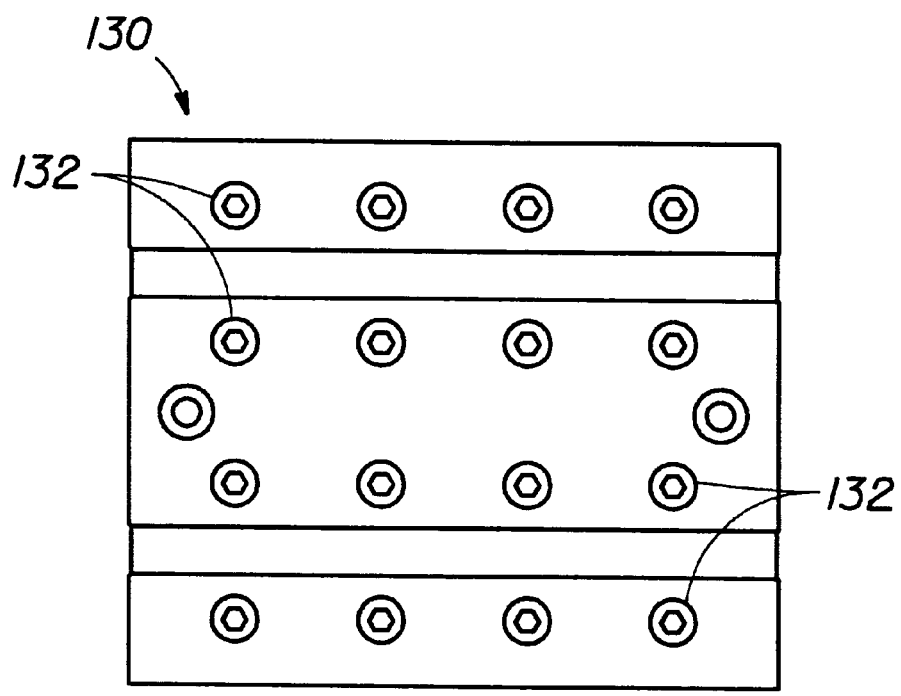
FIG. 13 is an end-on view of the endplate shown in FIG. 12.

FIG. 13 is an end-on view of the endplate 127 shown in FIG. 12. The strapped stack 130 includes a 4 by 4 array of equally spaced compression screws and bolts 132 are used to compress the stack. The use of an array of screws permits the compressive force to be spread evenly over the entire surface of the stack by varying the degree to which each of the screws is extended or tightened.

The following example shows the function of this invention and some of its embodiments. The example illustrates the effectiveness of a strap closure system.

EXAMPLE

A set of flat metal plates the same size and shape as a fuel cell stack were assembled between a pair of conventional filter-press type endplates. A pressure recording film was placed between a selected pair of plates to measure the compressive load and its distribution. Tie rods were extended through the endplates and then tightened using a torque of 35 in-lb, a degree of force that is standard in compression and sealing of a filter-press type fuel cell stack. After the stack was dismantled, the pressure recording film was examined and found to be relatively evenly compressed.

The same set of plates simulating a fuel cell were again assembled, with a new pressure recording film placed in the same position where the first film was placed. This time a set of endplates designed for use with a strap closure were used together with the simulated stack. This stack was secured using polyester straps with steel crimping clamps used to maintain the tension. After closing, the straps were cut and the stack disassembled. The pressure recording film was found to have a pattern similar to what had previously been recorded with the tie-rod structure.

While the foregoing is directed to the preferred embodiment of the present invention, other and further embodiments of the invention may be devised without departing from the basic scope thereof, and the scope thereof is determined by the claims which follow.

What is claimed is:

1. An apparatus comprising:
   an electrochemical cell stack having a plurality of components;
   a banding member disposed about the cell components to secure the cell components in intimate contact; and
   one or more load distributing elements disposed between the banding member and the stack.

2. The apparatus of claim 1 wherein the banding member is continuous.

3. The apparatus of claim 1 wherein the banding member has first and second ends joined by a fastener.

4. The apparatus of claim 3 wherein the fastener comprises a link.

5. The apparatus of claim 1 wherein the banding member comprises one or more straps.

6. The apparatus of claim 1 wherein the banding member comprises a component selected from a polymeric component, a fibrous component, and combinations thereof.

7. The apparatus of claim 1, wherein the banding member comprises a tension adjusting member.

8. The apparatus of claim 1 wherein the one or more load distributing elements are integral to the stack.

9. The apparatus of claim 1 wherein the one or more load distributing elements are removably attached between the stack and the banding element.

10. The apparatus of claim 1 wherein the one or more load distributing elements comprise one or more ridges.

11. The apparatus of claim 1 wherein the one or more load distributing elements comprise two or more ridges, and at least two of the ridges have various heights for avoiding interference between different banding members.

12. The apparatus of claim 1 having first and second banding members disposed around the stack and load distributing elements, wherein the second banding member is crosswise to the first banding member.

13. The apparatus of claim 12 having two or more load distributing elements wherein a first load distributing element has greater height than a second load distributing element.

14. The apparatus of claim 1 wherein the plurality of components comprise an endplate having a rounded edge for receiving the banding member.

15. The apparatus of claim 1 wherein the banding member provides compression to the stack.

16. The apparatus of claim 15 further comprising one or more screws adjustably attached to at least one face of the stack.

17. A method of assembling and compressing a plurality of electrochemical cells arranged in the form of a stack placed between two endplates comprising placing one or more load distributing elements between the endplates and a banding member; and
    securing the stack with the banding member.

18. The method of claim 17 wherein the banding member has first and second ends further comprising a fastener joining the first and second ends of the banding member.

19. The method of claim 17 further comprising tightening the banding member to compress the stack and endplates.

20. The method of claim 19 further comprising adjusting the compression force on the stack.

21. The method of claim 19 further adjusting the tension on the banding member.

22. The method of claim 17 wherein the one or more load distributing elements are ridges.

23. The method of claim 17 wherein one or more of the load distributing elements are integral to the endplates.

24. The method of claim 17 wherein one or more of the load distributing elements are removable.

25. The method of claim 24 wherein one or more of the load distributing elements are cylindrical.

26. The method of claim 24 wherein at least one of the endplates has one or more depressions for lodging one or more of the removable load distributing elements.

27. The method of claim 17 further comprising providing at least one endplate with one or more threaded holes oriented out of the plane of the at least one endplate; placing one or more threaded components in the threaded holes; and varying the extension of the threaded components.

28. The method of claim 27 further comprising disposing an insulating barrier between a threaded component and the electrochemical stack.

29. The method of claim 27 further comprising a force reporting device in communication with a threaded component.

30. The method of claim 29 wherein the force reporting device is integral to the threaded component.

31. The apparatus of claim 7 wherein the tension adjusting member comprises a screw closure clamp joining the first and second ends of the banding member.

32. The apparatus of claim 1, wherein the load distributing elements comprise one or more screws adjustably attached to at least one face of the stack.

33. The apparatus of claim 2, wherein the banding member provides compression to the stack.

34. The apparatus of claim 3, wherein the banding member provides compression to the stack.

35. The apparatus of claim 5, wherein the banding member provides compression to the stack.

36. The apparatus of claim 6, wherein the banding member provides compression to the stack.

37. The apparatus of claim 8, wherein the load distributing elements comprise one or more ridges.

38. The apparatus of claim 37, wherein the ridges have various heights for avoiding interference between different banding members.

39. The apparatus of claim 9, wherein one or more of the load distributing elements are cylindrical.

40. The apparatus of claim 9, wherein the endplates have one or more depressions for lodging one or more removable load distributing elements.

41. The method of claim 17 wherein the banding member is continuous.

42. The method of claim 17 wherein one or more load distributing elements cumulatively comprise two or more ridges, and at least two of the ridges have various heights for avoiding interference between different banding members.

43. The method of claim 17 wherein one or more of the load distributing elements are cylindrical.

44. The method of claim 17 wherein at least one of the endplates has one or more depressions for lodging one or more distributing elements.

\* \* \* \* \*